United States Patent [19]

Schwagmann

[11] Patent Number: 5,321,844

[45] Date of Patent: Jun. 14, 1994

[54] METHOD FOR ERROR CORRECTION OF SOFTWARE ERRORS IN A COMMUNICATION SYSTEM

[75] Inventor: Josef Schwagmann, Dachau, Fed. Rep. of Germany

[73] Assignee: Siemens Aktiengesellschaft, Munich

[21] Appl. No.: 800,990

[22] Filed: Dec. 2, 1991

[30] Foreign Application Priority Data

Dec. 20, 1990 [DE] Fed. Rep. of Germany ....... 4041031

[51] Int. Cl.⁵ ...................... G06F 12/08; G06F 13/18
[52] U.S. Cl. .................................. 395/800; 395/400;
395/200; 364/131; 364/134; 364/246.2;
364/266.6; 364/280.7; 364/737; 364/DIG. 1;
364/DIG. 2
[58] Field of Search ............... 395/800, 500, 200, 425,
395/400; 364/DIG. 1, DIG. 2, 131, 134, 737,
246.2, 266.6, 280.7

[56] References Cited

U.S. PATENT DOCUMENTS

| | | | |
|---|---|---|---|
| 4,276,594 | 6/1981 | Morley | 395/800 |
| 4,441,154 | 4/1984 | McDonough et al. | 395/800 |
| 4,885,739 | 12/1989 | Read et al. | 370/58.1 |
| 4,969,088 | 11/1990 | McAuliffe et al. | 395/325 |
| 5,163,131 | 11/1992 | Row et al. | 395/200 |
| 5,175,825 | 12/1992 | Starr | 395/325 |

*Primary Examiner*—Alyssa H. Bowler
*Assistant Examiner*—Dzung C. Nguyen
*Attorney, Agent, or Firm*—Hill, Steadman & Simpson

[57] ABSTRACT

In a communication system having connector modules, a switching network serving for the through-connection of calls, a central signal channel, as well as a multiprocessor system for central control, patch methods must take specific multiprocessor properties of the communication system into consideration. After the call-in of a patch command composed of a plurality of sub-components and provided with a plurality of destination addresses, a branching is implemented to the patch processes residing in the respective local memory systems of the various connector modules or of the multiprocessor system. Furthermore, after evaluation of the sub-components, information data corresponding to code modifications are edited. Further patch processes exclusively reserve at least one of the processors of the various connector modules or of the multiprocessor system, in that a first patch process having a lower priority level than the processes allocated to the normal operation of the communication system accesses at least one of the processors only when all processes of a high priority level sequencing on this processor have ended their task and in that, following immediately thereupon, a second patch process having a priority level exceeding the priority levels of the processes allocated to the normal operation of the communication system assume the introduction of the edited code modifications and, due to its priority level, can also not be interrupted by processes of a lower priority level. After the conclusion of the patch, the exclusively reserved processors are returned to the procedures of the switching technology.

6 Claims, 2 Drawing Sheets

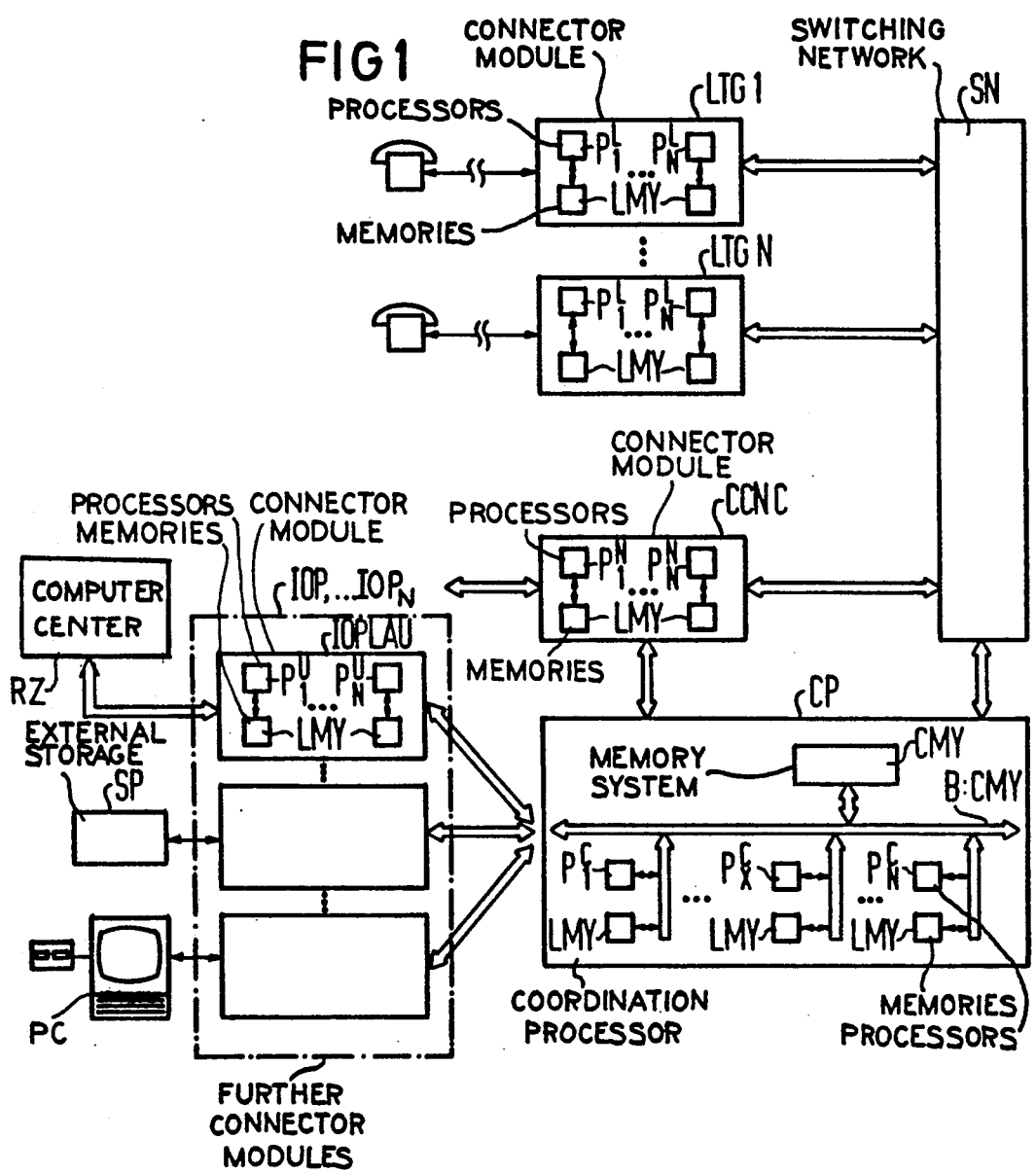

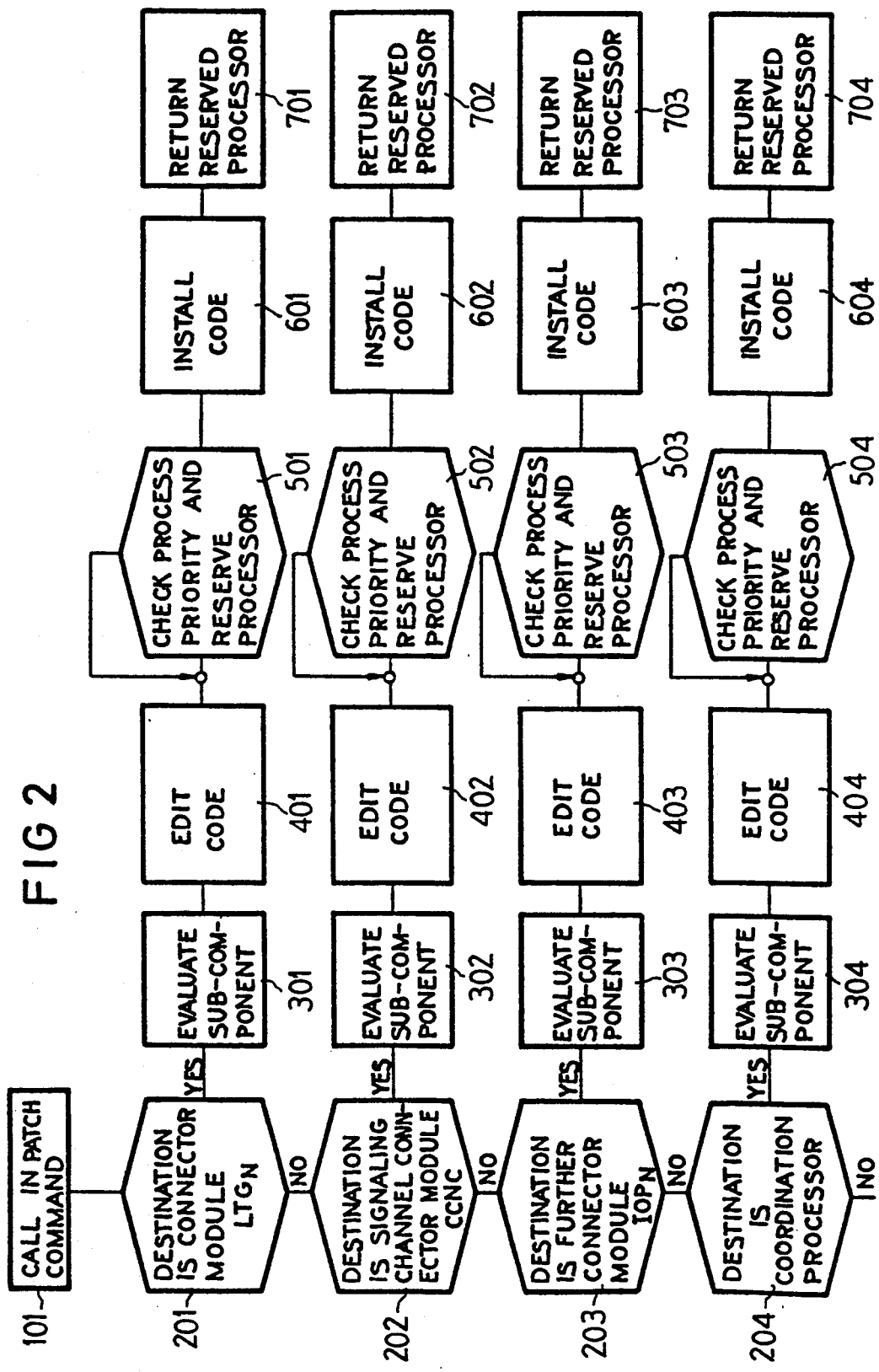

METHOD FOR ERROR CORRECTION OF SOFTWARE ERRORS IN A COMMUNICATION SYSTEM

BACKGROUND OF THE INVENTION

The present invention is directed to a communication system having a switching network, connector modules, a multiprocessor system and patch procedures for the correction of software errors.

Complex communication systems are usually realized as multiprocessor systems. Compared to single processor systems, the multiprocessor systems have advantages such as, for example, a significant increase in the processing speed. This is achieved by parallel handling of a plurality of tasks, each of which respectively represent sub-tasks of a task to be handled. Every processor handles a sub-task and the sub-results are compiled to form an overall result.

In addition to high processing speed, another requirement of modern communication systems is to assure the availability of the system for all subscribers at any time, this being achieved by a far-reaching redundancy of central parts of the system. Thus, international standardization committees for communication systems/communication networks, for example, CCITT, require a high availability of the system over the entire service life, for example in the form that a communication system cannot be down for more than two hours over a period of twenty years. In order to satisfy these requirements, the internal operational sequences of the system must be controlled and monitored by a plurality of processes and procedures. The complexity of the procedures and processes sequencing in a communication system, however, is thus greatly increased. What is generally valid is that the error probability becomes greater as the system becomes more complex and multilayered.

Errors occurring during operation must therefore be analyzed and correction data must be immediately introduced into the system in order to reduce the error probability of the system and, thus, to enhance the availability of the system. In general, errors are unavoidable when creating procedures. Syntax errors can in fact be eliminated during the course of creation by specific procedures such as, for example, compiler procedures. However, logical coding errors cannot be identified via such a syntax check. They thus take affect during the ongoing operation and particularly occur where a complex interaction of procedures and processes takes place. The complexity of such a system, makes the appearance of a logical coding error possible only after a long operating time and thus makes an immediate elimination of such an error more difficult.

Although single processor systems of a traditional type allow corrected and, thus, re-coded procedure sequences to be edited, compiled, and linked again, as well as, re-introduced into the system with low outlay for time and work, such a procedure is no longer practical for present multiprocessor communication systems. The introduction of even minute corrections would require a renewed editing, compiling, as well as linking of all procedures of the overall communication system. Such a process, however, would generally take several days and would thus block computer centers for other jobs for a long period of time.

The necessity of developing methods that allow a fast, short-term introduction of less significant error corrections into the software of a communication system lead to the development of procedures for rapid correction of logical coding errors, referred to below as patches. Small software corrections can be implemented in the short-term with patches. On the basis of instructions via a user terminal, the modifications are directly supplied to the code executions to be corrected in the respective procedures. For simple logical coding errors the faulty code is overwritten. When, however, additional code must be inserted into the program execution, the introduced patch is connected to what is referred to as a "backpack". This contains additional program code that is necessary for eliminating the logical error and is deposited in a main memory area specifically provided for this purpose. The correction of the program code that has now been modified is effected during the later operational sequence in that the procedure branches to the introduced "backpack" at the corresponding modification location, after which a return occurs to the original program code. This event is controlled by what is referred to as a patch administration. The addresses of the "backpacks" allocated to the patches are stored in tabular form.

The creation of the procedures of a communication system implies a number of complex development steps since, first, the procedure is still affected with errors immediately after the coding process that can only be eliminated after further development steps and, second, further performance features are added, this usually denoting a linking of further procedures into the software of the communication system.

For organizational reasons, a version number is assigned to every development step. However, by means of a patch, only temporary error corrections that do not establish new versions are introduced into the system. When, during the course of using new performance features, new procedure components are produced and linked into the system to which corresponding, new version numbers are then assigned, these new procedure components are occasionally used to completely work the temporarily introduced patches into the procedures. The "former" patches are thus no longer carried along in the procedures provided with a new version number.

Simple logical coding errors can be corrected in the short-term with this method for fast error correction (patch method) and can be introduced into the procedures of the communication system. What are to be understood by simple logical coding errors are, for example, those errors that appear in a module to be handled by a single processor. However, due to the development toward multiprocessor systems, there are constellations that do not occur in a single processor architecture. Logical coding errors are thereby so complex and multilayered due to the interaction of a number of procedures and processes that an immediate correction of faulty code in the respective procedures is no longer possible without further steps. In addition to the errors known from the previous "single processor world", new types of errors have been introduced that occur cross-module, occur cross-processor, only occur when a specific network environment is present, or only occur in combination with corresponding firmware.

Such complex logical coding errors, however, can no longer be corrected and introduced into the system with the above-described patch method since the error corrections, (for example, in the case of cross-module logical coding errors) must be introduced in a modification step.

As already mentioned, the complexity of a system is directly correlated to its error probability and also to its availability. In practice, this means that the more patches (i.e. fast error corrections) that are situated in the modules, procedures and tables, the more complex the system. During the further course of the development process of the procedures of a communication system, additional procedures access these patches, in this case, thus, up to the assignment of the next version number.

Permanent physical addresses are allocated to the patches in the working memory. When additional data are to be inserted into the tables of the communication system during the course of a development process (particularly when additional subscribers are connected to the communication system), then this inherently involves a relocation of these physical addresses. This, however, is avoided in that the patches coming into consideration are analyzed and temporarily removed in a succession of laborious individual steps in order to introduce the corresponding data. In particular, the removal of patches that have already been introduced presents enormous problems in practice since errors formerly handled may now crop up again under certain circumstances. Since, as mentioned, additional procedures access introduced patches during the further course of the development process of the communication system, there is a probability of a total collapse or of a drastic limitation of the availability of the overall communication system that must be considered.

SUMMARY OF THE INVENTION

It is an object of the present invention to provide a patch method that allows an introduction of corrections of complex logical coding errors into the procedures of the initially defined communication system with adequate practicality.

This object is inventively achieved by a communication system composed of: a switching network for through-connection of calls; connector modules having first processors and first local memory systems allocated thereto; a multiprocessor system having a central system bus and serving for central system control, second processors having second local memory systems allocated thereto, as well as a memory system shared by all units of the multiprocessor system; a signaling channel connector module having third processors and serving for the control of a central signaling channel and third local memory systems allocated thereto; further connector modules having fourth processors and representing the connection of the multiprocessor system to external input/output devices and fourth local memory systems allocated thereto; and patch procedures for the correction of software errors of procedures/data residing in the communication system. The communication system is characterized in that, after the call-in of a patch command composed of a plurality of sub-components and provided with a plurality of destination addresses on the basis of at least one input/output device after the evaluation of the destination address, a branching is implemented to the patch processes residing in the respective local memory systems of the various connector modules or of the multiprocessor system. Furthermore, after evaluation of the sub-components, the communication system is characterized by the following.

Information data corresponding to the code modifications are edited in conformity with the system in a first step as an integral component part of the patch command.

Further patch processes exclusively reserve at least one of the processors of the various connector modules or of the multiprocessor system in a second step, in that a first patch process having a lower priority level than the processes allocated to the normal operation of the communication system accesses at least one of the processors only when all processes of a high priority level sequencing on this processor have ended their task and in that, following immediately thereupon, a second patch process having a priority level exceeding the priority levels of the processes allocated to the normal operation of the communication system assumes the introduction of the edited code modifications and, due to its priority level, can also not be interrupted by processes of a lower priority level.

After the conclusion of the patch, the exclusively reserved processors are returned to the procedures of the switching technology in a third step.

In the invention code modifications are introduced into the procedures of the communication system during ongoing operation thereof without particular limitation of the switching-oriented functions. Among other things, this is achieved by a different prioritization of the patch processes responsible for the insertion event. It is thus assured that the insertion event does not interrupt processes of, for example, the switching task that are just sequencing and is also not itself interrupted. This makes it possible to react in a relatively short time to complex logical coding errors that occur in the overall communication system during ongoing operation.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a block diagram of a modularly structured communication system for the present invention; and FIG. 2 is a flow chart depicting operation of the present invention in the FIG. 1 communication system.

DESCRIPTION OF THE PREFERRED EMBODIMENT

FIG. 1 shows a modularly structured communication system. The communication system has: a switching network SN that serves for the through-connection of calls; connector modules $LTG_l \ldots LTG_n$ that have processors $P^L{}_l \ldots P^L{}_N$ and serving for the connection of subscriber equipment and local memory systems LMY allocated thereto; a connector module CCNC that has processors $P_{Nl} \ldots P_{Nn}$ and serving for the control of the central signaling channel and local memory systems LMY allocated thereto; a coordination processor CP composed of a memory system CMY shared by all units of the coordination processor CP, a central bus system B:CMY shared by all units of the coordination processor CP, and a plurality of processors $P_{Cl} \ldots P_{Cn}$ having local memory systems LMY allocated thereto; and further connector modules $IOP_l \ldots IOP_n$ that are connected to the central system bus B:CMY of the coordination processor CP and via which external storage systems SP, external input/output devices PC as well as an external computer center RZ can be connected.

The introduction of fast error corrections is generally only possible where processors are present having working memories allocated to them. In the communication system of FIG. 1, this is the case in the connector modules $LTG_I \ldots LTG_n$, in the central signaling channel connector module CCNC, in the coordination processor CP, as well as, in the connector module IO-PLAU functioning as an interface to an external computer center RZ. The patch procedures are deposited in the respective memories LMY, as well as, in the common memory system CMY of the coordination processor CP. The patch procedures are called in with a specific command by the input/output device PC. The communication between user and patch procedures thereby occurs by using symbolic commands and names.

Upon call-in of the patch command (101) via the external input/output device PC, an immediate branch is undertaken to the patch procedures of the coordination processor CP residing in the memory system CMY (204 or 201, 202, 203, 204). These execute a syntax check of the input patch command, structure information regarding what coding is to be modified in what procedure, and, if necessary, forward the corresponding commands to the appertaining units (304 of 301, 302, 303, 304). The introduction of patches into faultily coded procedures of the communication system assumes an interrupt-free introduction (404 of 401, 402, 403, 404). Like most system procedures and switching-oriented procedures of a communication system, patch procedures are combined in processes. In order to be able to control complex tasks in view of their urgency, what are referred to as priority levels (504 of 501, 502, 503, 504) have been allocated to these processes. Processes that sequence in a lower priority level can thereby be interrupted at any time by processes having higher priority. In order to assure an interrupt-free introduction of fast error corrections into the procedures of the communication system, an optimally high priority is assigned to the patch process responsible for the actual insertion event. The priority levels are assigned to the respective processes in tabular form. Before a processor handles a process, it receives an occupation request in the form of an interrupt. The patch event occurs in two steps, whereby a defined priority level is assigned to each step. A first process representing the first step has a low priority, whereas a further, second process that represents the second step is assigned a high priority. The advantages of this constellation are set forth in greater detail with reference to the exemplary embodiment.

Let it be assumed that a cross-module, logical coding error in the local memory system LMY of the processor $P^N{}_N$ of the central signaling channel connector module CCNC is to be corrected. After input of the patch command and the execution of the syntax check by the patch procedures residing in the common memory system CMY of the coordination processor CP, the latter branch to the patch procedures residing in the local memory system LMY of the processor $P^N{}_N$ that are responsible for the introduction of the code modifications. The patch procedures are organizationally compiled in patch processes.

The faulty codings occurring in a plurality of modules can now be correspondingly modified via the input/output device PC, or via the external computer center RZ. If necessary a "backpack" to be created in a specific memory area can also be introduced for the modified code. What is critical, however, is that the information corresponding to the code modifications are first edited in a specific memory area made available for this purpose to patch procedures. The actual code to be modified thereby still remains unmodified in the appertaining software module. The insertion of the initially edited code modifications is only subsequently implemented (604 and 704 of 601, 602, 603, 604 and 701, 702, 703, 704, respectively) by patch processes that pass through two different priority levels. This procedure is identical in the correction of cross-module and cross-processor errors and shall be set forth in detail when discussing the insertion process of cross-processor logical coding errors. After the conclusion of all insertion processes, the processor $P^N{}_N$ is again enable and is thus again available to the system-oriented, as well as, switching-oriented procedures. The processor $P^N{}_N$ is thus in fact blocked for the internal system procedures, as well as, for the switching- (oriented procedures for the duration of the insertion event. However, this is not a limitation since, on the one hand, other processors can assume these tasks during this time under certain circumstances and, on the other hand, the introduction of fast error corrections is preferably implemented in a slack traffic period.

What is critical for the patch event is the fact that this can only be considered to be successfully terminated when the corrections have been introduced into all modules ("all-or-nothing rule"). This is monitored by specific routines provided for this purpose in the patch procedures. An appropriate updating of the modified coding on the external storage medium SP is only then carried out.

In particular, what are referred to as cross-processor logical coding errors are also included among the more complex, logical coding errors defined above in detail. They occur in multiprocessor systems wherein a plurality of processors handle different processes, whereby their individual results are in turn compiled to form an overall result or also occur in interfaces that are formed by two or more processors. In the exemplary embodiment, such an interface, for example, would be the connection between the coordination processor CP and the central signaling channel connector module CCNC. The introduction of code modifications for eliminating cross-processor errors occurs in a manner similar to the method just set forth for eliminating cross-module errors. After the execution of the syntax check by the patch procedures residing in the common memory system CMY of the coordination processor CP, a branch is also undertaken here to the patch procedures residing in the respective local memory systems LMY, whereby the information corresponding to the code modifications are edited in a specific memory area reserved for this purpose. Here, too, the code that is still to be modified in the memory LMY is not modified during this step. Internal system processes as well as switching-oriented processes via the processes $P^N{}_N$ and $P^C{}_N$ forming the interface between central signaling module CCNC and coordination processor CP can continue to sequence during this event in the appertaining software modules wherein the code modifications are to be inserted. In a first step, patch processes having low priority are now started for reserving both processors $P^N{}_N$, $P^C{}_N$. High, priority processes just sequencing on the processors $P^N{}_N$, $P^C{}_N$ are thereby not interrupted. The patch processes having low priority access the processors $P^N{}_N$, $P^C{}_N$ only when these have concluded their task. Immediately thereafter, further, second processes having high priority are started, these implementing the insertion of the modified code, as well as, potentially existing "backpacks". As a result of their high priority, however, these processes cannot be interrupted. Since their execution, however, is of extremely brief duration, this does not represent any limitation for the switching-oriented procedures and processes that have been postponed for this time. The reservation of the processors $P^N{}_N$, $P^C{}_N$ thereby occurs independently of one another.

What is thereby problematical, however, is that one of the processors can break down during the insertion event. In this case, only a partial introduction of the corresponding error corrections would occur. For this reason, the above-described "all-or-nothing rule" was introduced into the patch procedures. In this case, this means that the system only accepts the patch when the individual error modifications have been introduced on each of the processors $P^N{}_N$, $P^C{}_N$.

Subsequently, the processors $P^N{}_N$, $P^C{}_N$ are re-enabled for system-oriented and switching-oriented procedures. The individual patch events are shown in the form of a flow chart in FIG. 2.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication system, having;
   a switching network for through-connection of calls,
   connector modules connected to the switching network and having first processors and first local memory systems allocated respectively to the first processors,
   a multiprocessor system for central system control and having a central system bus connected to second processors having second local memory systems allocated respectively to the second processors, and connected to a memory system shared by all second processors of the multiprocessor system,
   a signaling channel connector module for the control of a central signaling channel and having third processors and third local memory systems allocated respectively to the third processors, said signaling channel connector module connected to the switching network,
   further connector modules for connecting the multiprocessor system to external input/output devices and having fourth processors and fourth local memory systems allocated respectively to the fourth processors,
   each of the further connector modules connected to the central system bus in the multiprocessor system, and
   patch procedures for correcting software errors of procedures/data residing in the communication system,
comprising:
   a patch command having a plurality of sub-components and a plurality of destination addresses input by at least one input/output device;
   a means for branching to patch processes residing in respective memory systems of the connector modules, the signaling channel connector module and the further connector modules, and of the multiprocessor system after evaluation of the destination addresses, and, for use after evaluation of the sub-components,
   means for editing information data corresponding to code modifications in conformity with the multiprocessor system, the means for editing information occurring in a first step as an integral component part of the patch command, and
   means for exclusively reserving by further patch processes at least one of the first processors of the connector modules, the signaling channel connector module and the further connector modules and of the multiprocessor system in a second step, said further patch processes including a first patch process having a lower priority level than regular processes allocated to normal operation of the communication system accesses at least one of the first processors of the connector modules, the signaling channel connector module and the further connector modules only when all regular processes of a high priority level sequencing on the respective processor have terminated and said further patch processes including, following immediately the first patch process, a second patch process having a priority level exceeding the priority levels of the regular processes allocated to the normal operation of the communication system installs edited code modifications and, has another priority level, such that the second patch process can not be interrupted by regular processes having the lower priority levels, and
   means for returning exclusively reserved processors to the regular processes of the communication system in a third step after a conclusion of the patch processes.

2. The communication system according to claim 1, wherein the patch processes are only successfully terminated when all said sub-components forming a modification have been successfully introduced.

3. The communication system according to claim 1, wherein communication between a user and said patch processes occurs by means of symbolic names for processes, procedures, modules and addresses.

4. A method of installing a patch in a communication system, having:
   a switching network for through-connection of calls,
   connector modules connected to the switching network and having first processors and first local memory systems allocated respectively to the first processors,
   a multiprocessor system for central system control and having a central system bus connected to second processors having second local memory systems allocated respectively to the second processors, and connected to a memory system shared by all second processors of the multiprocessor system,
   a signaling channel connector module for the control of a central signaling channel and having third processors and third local memory systems allocated respectively to the third processors, said signaling channel connector module connected to the switching network, further connector modules for connecting the multiprocessor system to external input/output devices and having fourth processors and fourth local memory systems allocated respectively to the fourth processors, each of the further connector modules connected to the central system bus in the multiprocessor system, and patch procedures for correcting software errors of procedures/data residing in the communication system, comprising the steps of:

inputting a patch command having a plurality of sub-components and a plurality of destination addresses by at least one input/output device;

after evaluation of the destination addresses, implementing a branching to patch processes residing in respective memory systems of the connector modules, the signaling channel connector module and the further connector modules, and of the multiprocessor system, and, after evaluation of the sub-components, editing information data corresponding to code modifications in conformity with the multiprocessor system in a first step as an integral component part of the patch command, and exclusively reserving by further patch processes at least one of the first processors of the connector modules, the signaling channel connector module and the further connector modules and of the multiprocessor system in a second step, in that a first patch process having a lower priority level than regular processes allocated to normal operation of the communication system accesses at least one of the first processors of the connector modules, the signaling channel connector module and the further connector modules only when all regular processes of a high priority level sequencing on the respective processor have terminated and in that following immediately the first patch process, a second patch process having a priority level exceeding the priority levels of the regular processes allocated to the normal operation of the communication system installs edited code modifications and, has another priority level, such that the second patch process can not be interrupted by regular processes having the lower priority levels, and after a conclusion of the patch process, returning exclusively reserved processors to the regular processes of the communication system in a third step.

5. The communication system according to claim 4, wherein the patch processes only are successfully terminated when all said sub-components forming a modification have been successfully introduced.

6. The communication system according to claim 4, wherein communication between a user and said patch processes occurs by means of symbolic names for processes, procedures, modules and addresses.

* * * * *